US011259503B1

(12) United States Patent
Broussard, Sr.

(10) Patent No.: US 11,259,503 B1
(45) Date of Patent: Mar. 1, 2022

(54) CHICKEN FEEDER

(71) Applicant: Joe W. Broussard, Sr., Sillsbee, TX (US)

(72) Inventor: Joe W. Broussard, Sr., Sillsbee, TX (US)

( * ) Notice: Subject to any disclaimer, the term of this patent is extended or adjusted under 35 U.S.C. 154(b) by 342 days.

(21) Appl. No.: 16/220,029

(22) Filed: Dec. 14, 2018

(51) Int. Cl.
*A01K 39/01* (2006.01)
(52) U.S. Cl.
CPC .................................. *A01K 39/01* (2013.01)
(58) Field of Classification Search
CPC .. A01K 39/01; A01K 39/012; A01K 39/0125; A01K 39/014
See application file for complete search history.

(56) References Cited

U.S. PATENT DOCUMENTS

| | | | |
|---|---|---|---|
| 1,062,610 A | 5/1913 | Schisler | |
| 1,228,727 A | 6/1917 | Wetzel, Jr. | |
| 1,810,230 A * | 6/1931 | Thumann | A01K 39/012 |
| | | | 119/52.1 |
| 1,922,435 A | 8/1933 | Harris | |
| 2,494,950 A * | 1/1950 | Elmers | A01K 5/0241 |
| | | | 119/53.5 |
| 2,525,246 A * | 10/1950 | Swansey | A01K 39/012 |
| | | | 119/55 |
| 2,532,726 A * | 12/1950 | Lajoie | A01K 39/012 |
| | | | 119/52.2 |
| 2,539,536 A | 1/1951 | Floch | |
| 2,583,203 A * | 1/1952 | Bergeron | A01K 39/012 |
| | | | 119/52.1 |
| 2,854,949 A * | 10/1958 | Wiggins | A01K 39/012 |
| | | | 119/53 |
| 3,716,172 A * | 2/1973 | Crippen | A01K 5/0291 |
| | | | 222/453 |
| 3,742,913 A * | 7/1973 | Crippen | A01K 5/0275 |
| | | | 119/51.11 |
| 3,776,190 A * | 12/1973 | Hurlbert | A01K 1/0356 |
| | | | 119/478 |
| 4,911,727 A * | 3/1990 | King | A01K 5/0216 |
| | | | 119/51.5 |
| 5,243,930 A | 9/1993 | Rahm | |
| 8,272,350 B1 * | 9/2012 | England | A01K 5/025 |
| | | | 119/52.1 |
| 8,833,304 B2 * | 9/2014 | Whitsett | A01K 5/02 |
| | | | 119/57.92 |

(Continued)

FOREIGN PATENT DOCUMENTS

GB 1489348 A * 10/1977 ............. A01K 39/01

OTHER PUBLICATIONS

What's your favorite most efficient chicken feeder? Article [online]. Pinterest [retrieved on Jul. 13, 2017]. Retrieved from the Internet: <URL: https://www.pinterest.com/pin/279786195573407361/>.

(Continued)

*Primary Examiner* — Ebony E Evans
(74) *Attorney, Agent, or Firm* — Cramer Patent & Design, PLLC; Aaron R. Cramer (57) ABSTRACT

An apparatus for dispensing feed to chickens includes a container defining an interior volume configured to hold said feed, baffles connected to said container and projecting into said interior volume, and feeder holes located through said container. The baffles are configured to direct said feed toward said feeder holes.

18 Claims, 7 Drawing Sheets

(56) References Cited

U.S. PATENT DOCUMENTS

2007/0051317 A1\* 3/2007 Bruner ................ A01K 1/0107
119/53

OTHER PUBLICATIONS

3 Bag EASY Automatic Chicken Feeder. Article [online] Copyright © 2018 J&J Acres [retrieved on Jul. 13, 2017]. Retrieved from the Internet: <URL: http://www.jandjacres.net/3-bag-easy-automatic-chicken-feeder/>.

\* cited by examiner

CHICKEN FEEDER

RELATED APPLICATIONS

Not applicable.

FIELD OF THE INVENTION

The present invention relates to animal feeders and, more particular to an apparatus for dispensing solid food to chicken.

BACKGROUND OF THE INVENTION

Chicken feeding systems are well-known in the art. However, conventional chicken feeders have various problems. One (1) such problem is that conventional chicken feeders allow chickens to pull out large amounts of feed from the feed-distribution pan or tube, which wastes large amounts of feed. Another such problem is that conventional chicken feeders do not segregate the feed being distributed to the chickens from the general living area of the chickens, which can lead to contamination of the feed. Accordingly, there is a need for an improved chicken feeder that overcomes these problems.

SUMMARY OF THE INVENTION

The inventor has recognized the aforementioned, inherent problems and lack in the art and observed that there is a need for a new and improved apparatus for dispensing solid food to chickens. The development of the present invention, which will be described in greater detail herein, fulfills this need.

In an embodiment, the disclosed apparatus for dispensing feed to chickens includes a container defining an interior volume configured to hold said feed, baffles connected to said container and projecting into said interior volume, and feeder holes located through said container. The baffles are configured to direct said feed toward said feeder holes.

Furthermore, the features and advantages described herein may be combined in various manners and embodiments as one skilled in the relevant art will recognize. The embodiment and examples disclosed herein can be practiced without one (1) or more of the features and advantages described in a particular embodiment or example.

Further advantages of the embodiments and examples disclosed herein will become apparent from a consideration of the drawings and ensuing description.

BRIEF DESCRIPTION OF THE DRAWINGS

The advantages and features of the embodiments and examples disclosed herein will become better understood with reference to the following more detailed description and claims taken in conjunction with the accompanying drawings, in which like elements are identified with like symbols, and in which:

DESCRIPTIVE KEY 10 chicken feeding apparatus
11 feed
12 container
14 baffles
16 walls
18 interior volume
20 front wall
22 back wall
24 left wall
26 right wall
28 bottom wall
30 open top
32 lid
34 top end
36 hinge
38 leg
40 rain guard
42 feeder hole
44 bottom end
46 gripping element
48 mounting element
50 gap
52 upper baffle
54 lower baffle
56 lower baffle-first end
58 lower baffle-second end
60 upper baffle-first end
62 upper baffle-second end
64 upper sub-chamber
66 lower sub-chamber
68 feed level

DETAILED DESCRIPTION OF THE PREFERRED EMBODIMENT

In accordance with the invention, the best mode is presented in terms of the illustrative example embodiments, herein depicted within FIGS. 1-8. However, the disclosure is not limited to a single described embodiment and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only one (1) particular configuration may be shown and described for purposes of clarity and disclosure and not by way of limitation of scope.

As used herein, the singular terms "a," "an," and "the" include plural referents unless the context clearly dictates otherwise. Thus, for example, reference to an object can include multiple objects unless the context clearly dictates otherwise.

As used herein, the terms "connect," "connected," and "connection" refer to a coupling or linking. Connected objects can be directly coupled to one (1) another or can be indirectly coupled to one (1) another, such as via another object.

As used herein, relative terms, such as "inner," "interior," "outer," "exterior," "top," "bottom," "front," "rear," "back," "upper," "upwardly," "lower," "downwardly," "vertical," "vertically," "lateral," "laterally," "above," "below," and the like refer to an orientation of a set of objects with respect to one (1) another, such as in accordance with the drawings, but do not require a particular orientation of those objects during manufacturing or use.

As used herein, the terms "first," "second," etc. are used merely as labels and do not impose any positional or hierarchical requirements on the item to which the term refers. Further, as used herein, the terms "left," "right," "upper," "lower," "inside," "outside," "top," "bottom," "front," "back" and similar terms are used merely to reference relative example positions of the item to which the term refers, for example, as illustrated in the accompanying drawings.

In the following description, numerous specific embodiments of the disclosed thermal relief device are provided, which may be practiced without some or all of the particular elements associated with any of the disclosed embodiments. In some instances, details of known devices and/or processes have been omitted to avoid unnecessarily obscuring the disclosure. While some examples will be described in conjunction with specific illustrated embodiments, these examples are not intended to be limiting. As such, reference herein to "an embodiment," "another embodiment," "an example," and "another example" means that one (1) or more element described in connection with that embodiment or example is included in at least one (1) implementation of the disclosed thermal relief device.

Referring generally to FIGS. 1-8, disclosed is an apparatus 10 for dispensing solid food, generally referred to herein as feed 11, to chickens, where like reference numerals represent similar or like parts. Generally, the disclosed apparatus 10 includes a container 12 for storage of feed 11 that is fed to chickens. The apparatus 10 also utilizes a series of baffles 14 configured to regulate or otherwise meter feed 11 to chickens. Beneficially, the apparatus 10 is configured to keep the feed 11 clean and segregated from chicken waste and other contamination, which can cause health issues for chickens. The apparatus 10 is also configured to prevent chickens from removing, or "scratching out," excess amounts of feed 11 from the container 12, which reduces waste.

Figure 1:
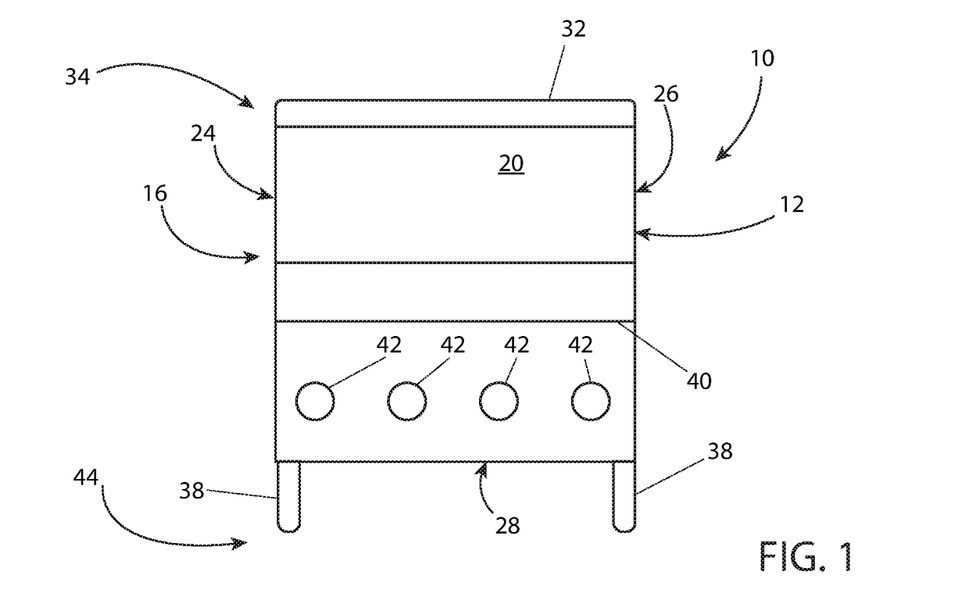
FIG. 1 is an end elevation view of an embodiment of the disclosed apparatus.
Figure 2:
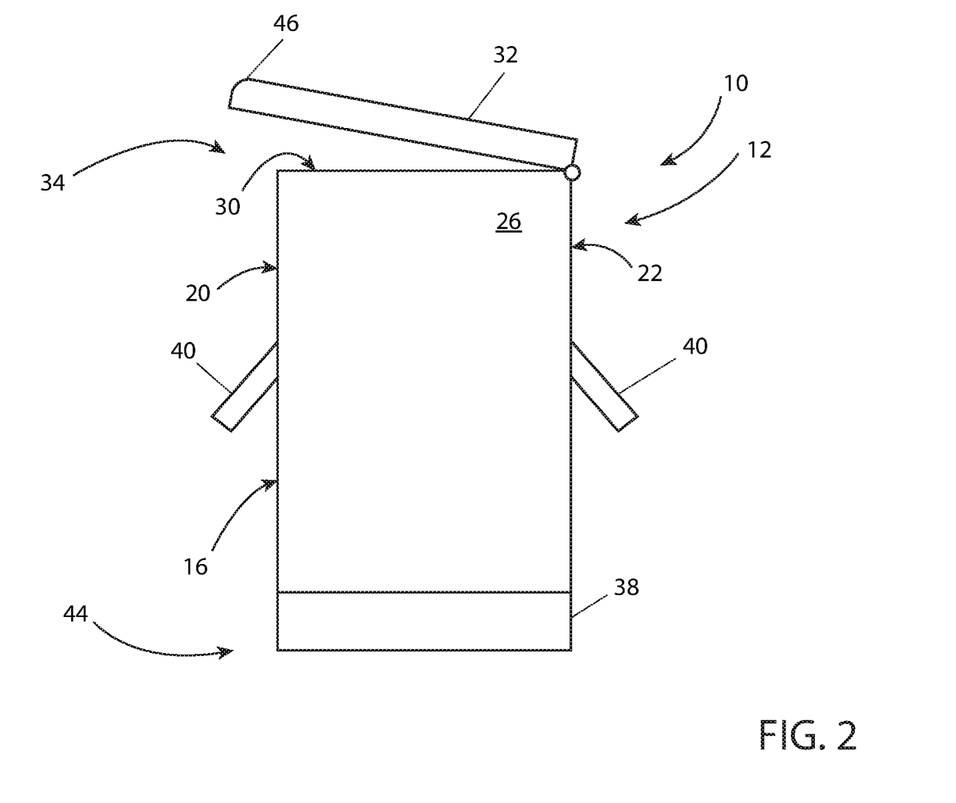
FIG. 2 is a side elevation view of an embodiment of the disclosed apparatus.

Referring to FIGS. 1 and 2, in various embodiments of the disclosed apparatus 10, the container 12 includes a plurality of walls 16 defining an interior volume 18. In an example, the container 12 includes a front wall 20 (may also be referred to as a first wall or front end wall), a back wall 22 (may also be referred to as a second wall or back end wall) opposite the front 20, a left wall 24 (may also be referred to as a third wall or left side wall), a right wall 26 (may also be referred to as a fourth wall or right side wall) opposite the left side wall 24, and a bottom wall 28 (may also be referred to as a fifth wall). Top ends, or upper ends, of the walls 16 form an open top 30 that provides access to the interior volume 18 of the container 12.

In an example, each one of the front wall 20, the back wall 22, the left wall 24 and the right wall 26 are positioned in a fixed approximately vertical orientation and the bottom wall 28 is positioned in a fixed approximately horizontal orientation. In an example, each one (1) of the walls 16 (i.e., the front wall 20, the back wall 22, the left wall 24, the right wall 26, and/or the bottom wall 28) are fixed approximately perpendicular to an adjacent one (1) of the walls 16, such that the container 12 has a generally rectangular shape (e.g., in end view, side view, and/or cross-section view).

The apparatus 10 also includes a lid 32. The lid 32 is removably connected to a top end 34 of the container 12 to cover the open top 30 and enclose the interior volume 18. In an example, the lid 32 is hingedly connected to one (1) of the walls 16, for example, via hinge 36. In the illustrative example, an outer edge of the lid 32 is hingedly connected to a top edge of the back wall 22. In various examples, the lid 32 also includes a gripping element 46 that is configured to project beyond the container 12 (e.g., beyond the front wall 20) to enable an operator to manually engage and lift the lid 32.

In an example construction of the apparatus 10, each one (1) of the front wall 20 and the back wall 22 has a first dimension (measured between the left wall 24 and the right wall 26) (e.g., width) of approximately sixteen inches (16 in.) and a second dimension (measured between the bottom wall 28 and the open top 30) (e.g. height) of approximately twenty-six inches (26 in.). Each one (1) of the left wall 24 and the right wall 26 has a first dimension (measured between the front wall 20 and the back wall 22) (e.g., width) of approximately twelve inches (12 in.) and a second dimension (measured between the bottom wall 28 and the open top 30) (e.g., height) of approximately twenty-six inches (26 in.). The bottom wall 28 has a first dimension (measured between the left wall 24 and the right wall 26) (e.g., width) of approximately fifteen inches (15 in.) and second dimension (measured between the front wall 20 and the back wall 22) (e.g., depth) of approximately twelve inches (12 in.). The lid 32 has a first dimension (measured between the left wall 24 and the right wall 26) (e.g., width) of approximately sixteen inches (16 in.) and a second dimension (measured between the front wall 20 and the back wall 22) (e.g., depth) of approximately sixteen inches (16 in.).

In another example construction of the apparatus 10, each one (1) of the front wall 20 and the back wall 22 has a first dimension (measured between the left wall 24 and the right wall 26) of approximately sixteen inches (16 in.) and a second dimension (measured between the bottom wall 28 and the open top 30) of approximately fourteen-and-a-half inches (14½ in.). Each one (1) of the left wall 24 and the right wall 26 has a first dimension (measured between the front wall 20 and the back wall 22) of approximately twelve inches (12 in.) and a second dimension (measured between the bottom wall 28 and the open top 30) of approximately eighteen inches (18 in.). The bottom wall 28 has a first dimension (measured between the left wall 24 and the right wall 26) of approximately fifteen inches (15 in.) and second dimension (measured between the front wall 20 and the back wall 22) of approximately twelve inches (12 in.). The lid 32 has a first dimension (measured between the left wall 24 and the right wall 26) of approximately sixteen inches (16 in.) and a second dimension (measured between the front wall 20 and the back wall 22) of approximately sixteen inches (16 in.).

In another example construction of the apparatus 10, each one (1) of the front wall 20 and the back wall 22 has a first dimension (measured between the left wall 24 and the right wall 26) of approximately sixteen inches (16 in.) and a second dimension (measured between the bottom wall 28 and the open top 30) of approximately six inches (6 in.). Each one (1) of the left wall 24 and the right wall 26 has a first dimension (measured between the front wall 20 and the back wall 22) of approximately seven inches (7 in.) and a second dimension (measured between the bottom wall 28 and the open top 30) of approximately six inches (6 in.). The bottom wall 28 has a first dimension (measured between the left wall 24 and the right wall 26) of approximately fifteen inches (15 in.) and second dimension (measured between the front wall 20 and the back wall 22) of approximately seven inches (7 in.). The lid 32 has a first dimension (measured between the left wall 24 and the right wall 26) of approximately sixteen inches (16 in.) and a second dimension (measured between the front wall 20 and the back wall 22) of approximately nine inches (9 in.).

In another example construction of the apparatus 10, each one (1) of the front wall 20 and the back wall 22 has a first dimension (measured between the left wall 24 and the right wall 26) of approximately eight inches (8 in.) and a second dimension (measured between the bottom wall 28 and the open top 30) of approximately seven inches (7 in.). Each one (1) of the left wall 24 and the right wall 26 has a first dimension (measured between the front wall 20 and the back wall 22) of approximately twelve inches (12 in.) and a second dimension (measured between the bottom wall 28 and the open top 30) of approximately six-and-a-half inches (6½ in.). The bottom wall 28 has a first dimension (measured between the left wall 24 and the right wall 26) of approximately six inches (6 in.) and second dimension (measured between the front wall 20 and the back wall 22) of approximately six inches (6 in.). The lid 32 has a first dimension (measured between the left wall 24 and the right wall 26) of approximately eight inches (8 in.) and a second dimension (measured between the front wall 20 and the back wall 22) of approximately seven inches (7 in.).

In some examples, the container 12 also includes legs 38 located at a bottom end 44 of the container 12 and configured to raise the bottom wall 28 of the container 12 off the ground. In an example, the legs 38 extend from (e.g., are connected to) the bottom wall 28. In another example, the legs 38 extend from (e.g., are connected to or form a part of) the left wall 24 and the right wall 26. In an example construction, each one (1) of the legs 38 has a width dimension (measured between the front wall 20 and the back wall 22) of approximately twelve inches (12 in.) and a height dimension (measured outwardly from the bottom wall 28) of approximately four inches (4 in.).

Those skilled in the art will recognize that the example constructions of the container 12 of the disclosed apparatus 10 and the specific example dimensions disclosed herein are provided as illustrative examples and other constructions having other dimensions are also contemplated.

In various examples, the apparatus 10 also includes a plurality of feeder holes 42 formed through the container 12. The feeder holes 42 are configured to provide access to the interior volume 18 of the container 12 by chickens (not shown) for distributing the feed 11 stored within the container 12. In an example, the feeder holes 42 are formed in one (1) of the front wall 20 or the back wall 22 proximate to the bottom end 44 of the container 12. In another example, the feeder holes 42 are formed in both the front wall 20 and the back wall 22 proximate to the bottom end 44 of the container 12. In an example construction, the feeder holes 42 are linearly aligned and extend between the left wall 24 and the right wall 26.

Generally, the feeder holes 42 are configured to enable a chicken to insert its head into the interior volume 18 of the container 12 to access the feed 11 and eat. In an example, each one (1) of the feeder holes 42 has a circular shape. In an example construction, each one (1) of the feeder holes 42 has an internal diameter dimension of approximately two-and-a-half inches (2½ in.). In an example construction, each one (1) of the feeder holes 42 is spaced a linear distance of between approximately two-and-a-quarter inches (2¼ in.) and approximately four inches (4 in.) away from the bottom end 44 of the container 12 (e.g., from a bottom edge of the bottom wall 28) depending, for example, of the particular version of the apparatus 10. As examples, the feeder holes 42 are located between approximately four inches (4 in.) and approximately eight inches (8 in.) above ground level, for example, depending upon the configuration and/or size of the container 12 and the configuration and size of the legs 38. In an example construction, each one (1) of the feeder holes 42 is spaced an equal distance from any linearly adjacent one (1) of the feeder holes 42. As an example, each one (1) of the feeder holes 42 is spaced a linear distance of approximately four inches from any linearly adjacent one (1) of the feeder holes 42. The apparatus 10 can include any number of feeder holes 42, for example, ranging from one (1) feeder hole 42 to four (4) feeder holes 42 or more than four (4) feeder holes 42. Those skilled in the art will recognize that the example constructions of the disclosed apparatus 10 and the specific example dimensions disclosed herein are provided as illustrative examples and other examples having other dimensions are also contemplated.

In some examples, the disclosed apparatus 10 also includes at least one (1) rain guard 40. The rain guards 40 are connected to the container 12 and extend outwardly over and above the feeder holes 42. The rain guard 40 is connected to and extends outwardly and downwardly from one or both the front wall 20 and/or the back wall 22 depending, for example, on the construction of the container 12 and which of the front wall 20 and/or the back wall 22 includes the feeder holes 42. The rain guard 40 can be oriented at an oblique angle relative to the associated one (1) of the front wall 20 and/or the back wall 22. As an example, the rain guard 40 can be oriented at an angle of approximately forty-five degrees (45°) relative to the associated one (1) of the front wall 20 and/or the back wall 22. Beneficially, the rain guard 40 protects the feeder holes 42 from water and prevents water from entering the feeder holes 42 and contaminating the solid food contained within the container 12 when the apparatus 10 is used in an outdoor environment. In an example construction, the rain guard 40 has a first dimension (e.g., length) approximately equal to the first dimension of the associated one (1) of the front wall 20 and/or the back wall 22 and a second dimension (measured from the associated one (1) of the front wall 20 and/or the back wall 22 to an outward end of the rain guard 40) (e.g., width) of approximately three inches (3 in.).

Referring to FIGS. 3-7, in various embodiments of the apparatus 10, the baffles 14 are configured to direct solid food stored within the interior volume 18 of the container 12 to the feeder holes 42 and are configured to regulate the amount of solid food directed to the feeder holes 42. Generally, the apparatus 10 includes at least one (1) upper baffle 52 (identified individually as first upper baffle 52-1 and second upper baffle 52-2 when more than one (1) upper baffle 52 is present) connected to and extending outwardly and downwardly from one (1) or both the front wall 20 and/or the back wall 22 into the interior volume 18 of the container 12. The apparatus 10 also include at least one (1) lower baffle 54 (identified individually as first lower baffle 54-1 and second lower baffle 54-2 when more than one (1) lower baffle 54 is present) connected to and extending upwardly from the bottom wall 28 into the interior volume 18 of the container 12. The number of upper baffles 52 and the number of lower baffles 54 may depend, for example, on the construction of the container 12 and which of the front wall 20 and/or the back wall 22 includes the feeder holes 42. Generally, there is one (1) upper baffle 52 for every one (1) lower baffle 54.

The upper baffle 52 can be oriented at an oblique angle relative to the associated one of the front wall 20 and/or the back wall 22. As an example, the upper baffle 52 can be oriented at an angle of approximately forty-five degrees (45°) relative to the associated one (1) of the front wall 20 and/or the back wall 22. The lower baffle 54 can be oriented at an oblique angle relative to the bottom wall 28. As an example, the lower baffle 54 can be oriented at an angle of approximately forty-five degrees (45°) relative to the bottom wall 28. In an example construction, the upper baffle 52 extends along an entirety of the associated one (1) of the front wall 20 and/or the back wall 22 has a first dimension (e.g., length) approximately equal to the first dimension of the associated one (1) of the front wall 20 and/or the back wall 22 and a second dimension (measured from the associated one (1) of the front wall 20 and/or the back wall 22 to an outward end of the upper baffle 52) (e.g., width) of between approximately three-and-a-half inches (3½ in.) and approximately five-and-a-half inches (5½ in.). The lower baffle 54 extends along an entirety of the bottom wall 28 has a first dimension (e.g., length) approximately equal to the first dimension of the associated one of the front wall 20 and/or the back wall 22 and a second dimension (measured from the associated one (1) of the front wall 20 and/or the back wall 22 to an outward end of the lower baffle 54) (e.g., width) of between approximately one-and-a-half inches (1½ in.) and approximately four inches (4 in.).

Figure 3:
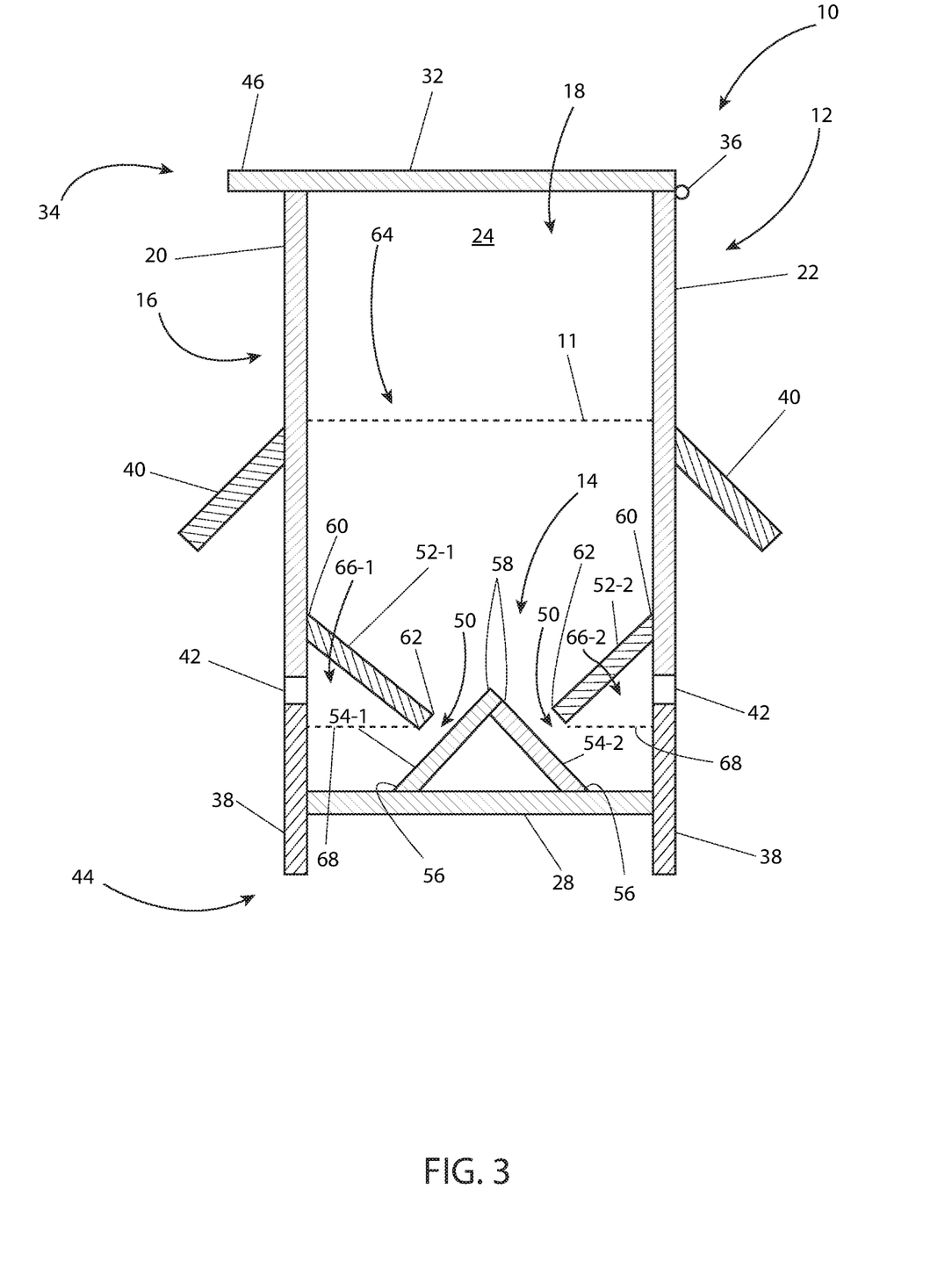
FIG. 3 is a side elevation, sectional view of an embodiment of the disclosed apparatus.

Referring to FIG. 3, in an example construction of the apparatus 10, the first upper baffle 52-1 is connected to and extends outwardly and downwardly from the front wall 20 into the interior volume 18 of the container 12 over, or above, the feeder holes 42 disposed through the front wall 20 (e.g., may also be referred to as a front-upper baffle). The second upper baffle 52-2 is connected to and extends outwardly and downwardly from the back wall 22 into the interior volume 18 of the container 12 over, or above, the feeder holes 42 disposed through the back wall 22 (e.g., may also be referred to as a back-upper baffle). The first upper baffle 52-1 has a first dimension (e.g., length) approximately equal to the first dimension of the front wall 20 and a second dimension (measured from the front wall 20 to an outward end of the first upper baffle 52-1) (e.g., width) of approximately five-and-a-half inches (5½ in.). The second upper baffle 52-2 has a first dimension (e.g., length) approximately equal to the first dimension of the back wall 22 and a second dimension (measured from the front wall 20 to an outward end of the second upper baffle 52-2) (e.g., width) of approximately five-and-a-half inches (5½ in.). The first upper baffle 52-1 is oriented at an angle of approximately forty-five degrees (45°) relative to the front wall 20. The second upper baffle 52-2 is oriented at an angle of approximately forty-five degrees (45°) relative to the back wall 22.

The first lower baffle 54-2 is connected to and extends upwardly from the bottom wall 28 into the interior volume 18 of the container 12 away from the front wall 20 (e.g., may also be referred to as a front-lower baffle). The second lower baffle 54-2 is connected to and extends upwardly from the bottom wall 28 into the interior volume 18 of the container 12 away from the back wall 22 and toward the first lower baffle 54-1 (e.g., may also be referred to as a back-lower baffle). Top, or upper ends, of the first lower baffle 54-1 and the second lower baffle 54-2, opposite the bottom wall 28, are connected together such that the first lower baffle 54-1, the second lower baffle 54-2 and the bottom wall 28 form a triangular shape. The first lower baffle 54-1 has a first dimension (e.g., length) approximately equal to the first dimension of the front wall 20 and a second dimension (measured from bottom wall 28 to an outward end of the first lower baffle 54-1) (e.g., width) of approximately four inches (4 in.). The second lower baffle 54-2 has a first dimension (e.g., length) approximately equal to the first dimension of the back wall 22 and a second dimension (measured from bottom wall 28 to an outward end of the second lower baffle 54-2) (e.g., width) of approximately three-and-a-half inches (3½ in.). The first lower baffle 54-1 is oriented at an angle of approximately forty-five degrees (45°) relative to the bottom wall 28. The second lower baffle 54-2 is oriented at an angle of approximately forty-five degrees (45°) relative to the bottom wall 28. The first lower baffle 54-1 and the second lower baffle 54-2 are oriented as an angle of approximately ninety degrees (90°) relative to each other.

In this example construction, the first upper baffle 52-1 is spaced away from the first lower baffle 54-1 by gap 50. The second upper baffle 52-2 is spaced away from the second lower baffle 54-2 by gap 50. In an example, gap 50 has a linear dimension of approximately one inch (1 in.). In an example construction, the first upper baffle 52-1 is orientated approximately perpendicular to the first lower baffle 54-1. The second upper baffle 52-2 is orientated approximately perpendicular to the second lower baffle 54-2. In this example, the first upper baffle 52-1 is positioned at the approximate middle of the first lower baffle 54-1 and the second upper baffle 52-2 is positioned at the approximately middle of the second lower baffle 54-2.

Figure 4:
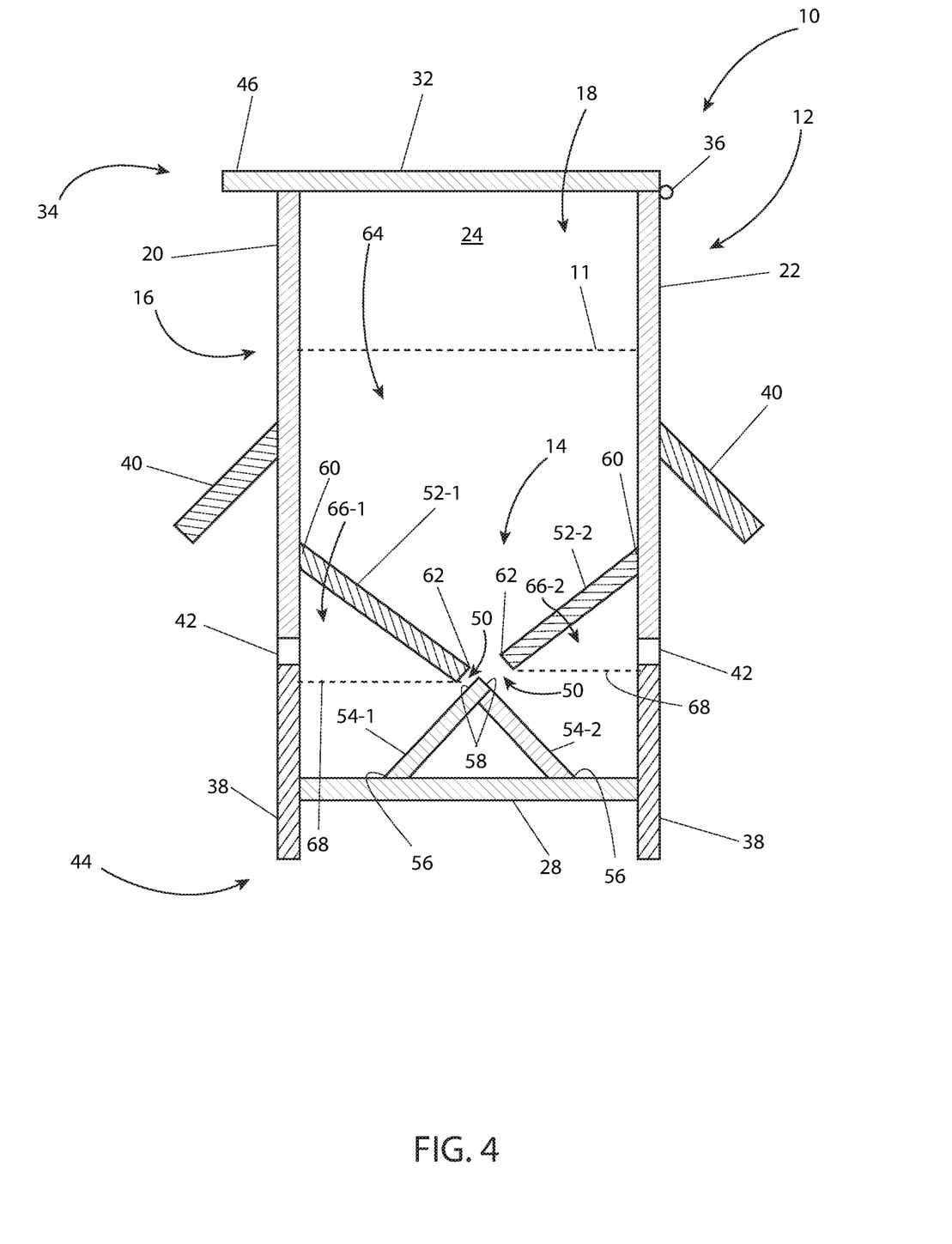
FIG. 4 is a side elevation, sectional view of an embodiment of the disclosed apparatus.

Referring to FIG. 4, in another example construction of the apparatus 10, the first upper baffle 52-1 has a first dimension (e.g., length) approximately equal to the first dimension of the front wall 20 and a second dimension (measured from the front wall 20 to an outward end of the first upper baffle 52-1) (e.g., width) of between approximately four inches (4 in.) and approximately five-and-a-half inches (5½ in.). The second upper baffle 52-2 has a first dimension (e.g., length) approximately equal to the first dimension of the back wall 22 and a second dimension (measured from the front wall 20 to an outward end of the second upper baffle 52-2) (e.g., width) of between approximately four inches (4 in.) and approximately five-and-a-half inches (5½ in.). The first upper baffle 52-1 is oriented at an angle of approximately forty-five degrees (45°) relative to the front wall 20. The second upper baffle 52-2 is oriented at an angle of approximately forty-five degrees (45°) relative to the back wall 22. The first lower baffle 54-1 has a first dimension (e.g., length) approximately equal to the first dimension of the front wall 20 and a second dimension (measured from bottom wall 28 to an outward end of the first lower baffle 54-1) (e.g., width) of between approximately two inches (2 in.) and approximately four inches (4 in.). The second lower baffle 54-2 has a first dimension (e.g., length) approximately equal to the first dimension of the back wall 22 and a second dimension (measured from bottom wall 28 to an outward end of the second lower baffle 54-2) (e.g., width) of between approximately two inches (2 in.) and approximately four inches (4 in.). The first lower baffle 54-1 is oriented at an angle of approximately sixty degrees (60°) relative to the bottom wall 28. The second lower baffle 54-2 is oriented at an angle of approximately sixty degrees (60°) relative to the bottom wall 28. The first lower baffle 54-1 and the second lower baffle 54-2 are oriented as an angle of approximately sixty degrees (60°) relative to each other.

In this example construction, the first upper baffle 52-1 is spaced away from the first lower baffle 54-1 by gap 50. The second upper baffle 52-2 is spaced away from the second lower baffle 54-2 by gap 50. In an example, gap 50 has a linear dimension of approximately one-half inch (½ in.). In an example construction, the first upper baffle 52-1 is orientated approximately perpendicular to the first lower baffle 54-1. The second upper baffle 52-2 is orientated approximately perpendicular to the second lower baffle 54-2. In this example, the first upper baffle 52-1 is positioned proximate to the outward end of the first lower baffle 54-1 and the second upper baffle 52-2 is positioned proximate to the outward end of the second lower baffle 54-2.

Figure 5:
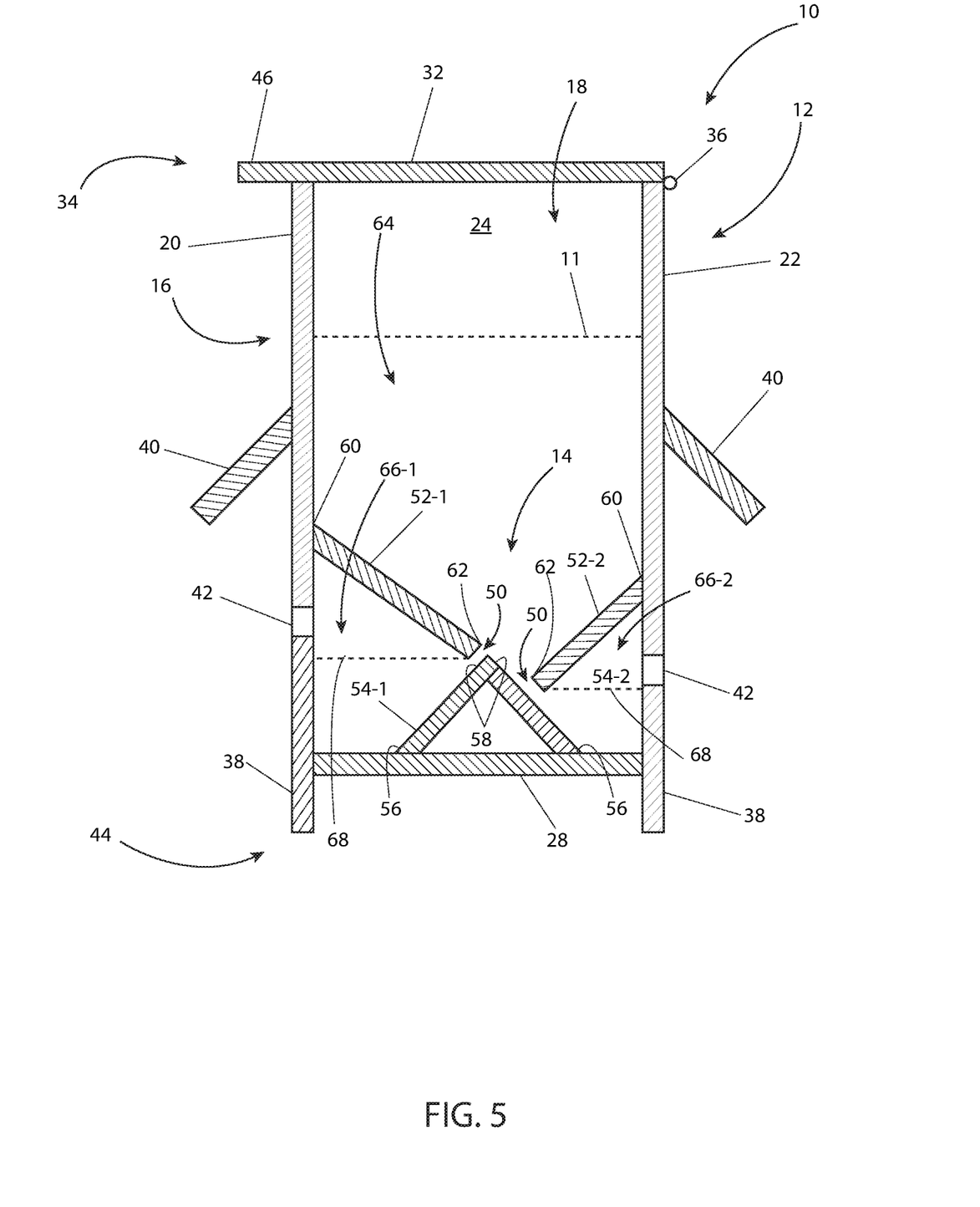
FIG. 5 is a side elevation, sectional view of an embodiment of the disclosed apparatus.

Referring to FIG. 5, in another example construction of the apparatus 10, the first upper baffle 52-1 is spaced away from the first lower baffle 54-1 by gap 50. The second upper baffle 52-2 is spaced away from the second lower baffle 54-2 by gap 50. In an example, gap 50 between the first upper baffle 52-1 and the first lower baffle 54-1 has a linear dimension of approximately on-half inch (½ in.) and gap 50 between the second upper baffle 52-2 and the second lower baffle 54-2 has a linear dimension of approximately one inch (1 in.). In an example construction, the first upper baffle 52-1 is orientated approximately perpendicular to the first lower baffle 54-1 and the second upper baffle 52-2 is orientated approximately perpendicular to the second lower baffle 54-2. In this example, the first upper baffle 52-1 is positioned proximate to the outward end of the first lower baffle 54-1 and the second upper baffle 52-2 is positioned is positioned at the approximately middle of the second lower baffle 54-2. Those skilled in the art will recognize that this configuration can be reversed, such that the first upper baffle 52-1 is positioned at the approximately middle of the first lower baffle 54-1 by gap 50 of approximately one inch (1 in.) and the second upper baffle 52-2 is positioned proximate to the outward end of the second lower baffle 54-2 by gap 50 of approximately one-half inch (½ in.).

Figure 6:
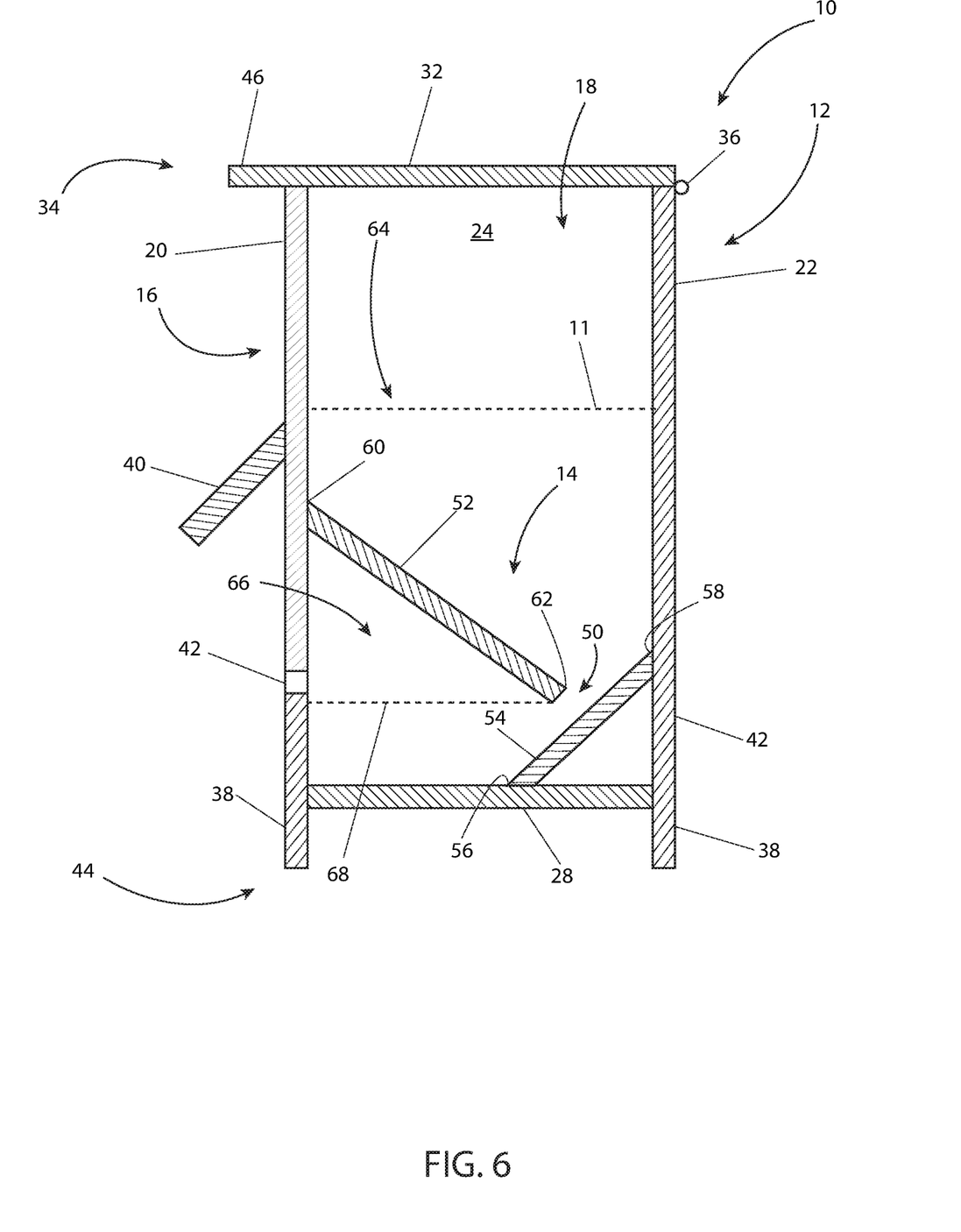
FIG. 6 is a side elevation, sectional view of an embodiment of the disclosed apparatus.

Referring to FIG. 6, in another example construction, the apparatus 10 includes one (1) upper baffle 52 and one (1) lower baffle 54. The upper baffle 52 is connected to and extends outwardly and downwardly from the front wall 20 into the interior volume 18 of the container 12 over, or above, the feeder holes 42 disposed through the front wall 20. The upper baffle 52 has a first dimension (e.g., length) approximately equal to the first dimension of the front wall 20 and a second dimension (measured from the front wall 20 to an outward end of the upper baffle 52) (e.g., width) of between approximately three-and-a-half inches (3½ in.) and approximately five-and-a-quarter inches (5½ in.). The upper baffle 52 is oriented at an angle of approximately forty-five degrees (45°) relative to the front wall 20. The lower baffle 54 is connected to and extends between the bottom wall 28 and the back wall 22 within the interior volume 18 of the container 12. The lower baffle 54 has a first dimension (e.g., length) approximately equal to the first dimension of the back wall 22 and a second dimension (measured from an end connected to the bottom wall 28 to an opposing end connected to the back wall 22) (e.g., width) of between approximately two inches (2 in.) and approximately four inches (4 in.). The lower baffle 54 is oriented at an angle of approximately forty-five degrees (45°) relative to the bottom wall 28 and at an angle of approximately forty-five degrees (45°) relative to the back wall 22.

In this example construction, the upper baffle 52 is spaced away from the lower baffle 54 by gap 50. In an example, gap 50 has a linear dimension of approximately one inch (1 in.). In an example construction, the upper baffle 52 is orientated approximately perpendicular to the lower baffle 54. In this example, the upper baffle 52 is positioned at the approximate middle of the lower baffle 54.

Figure 7:
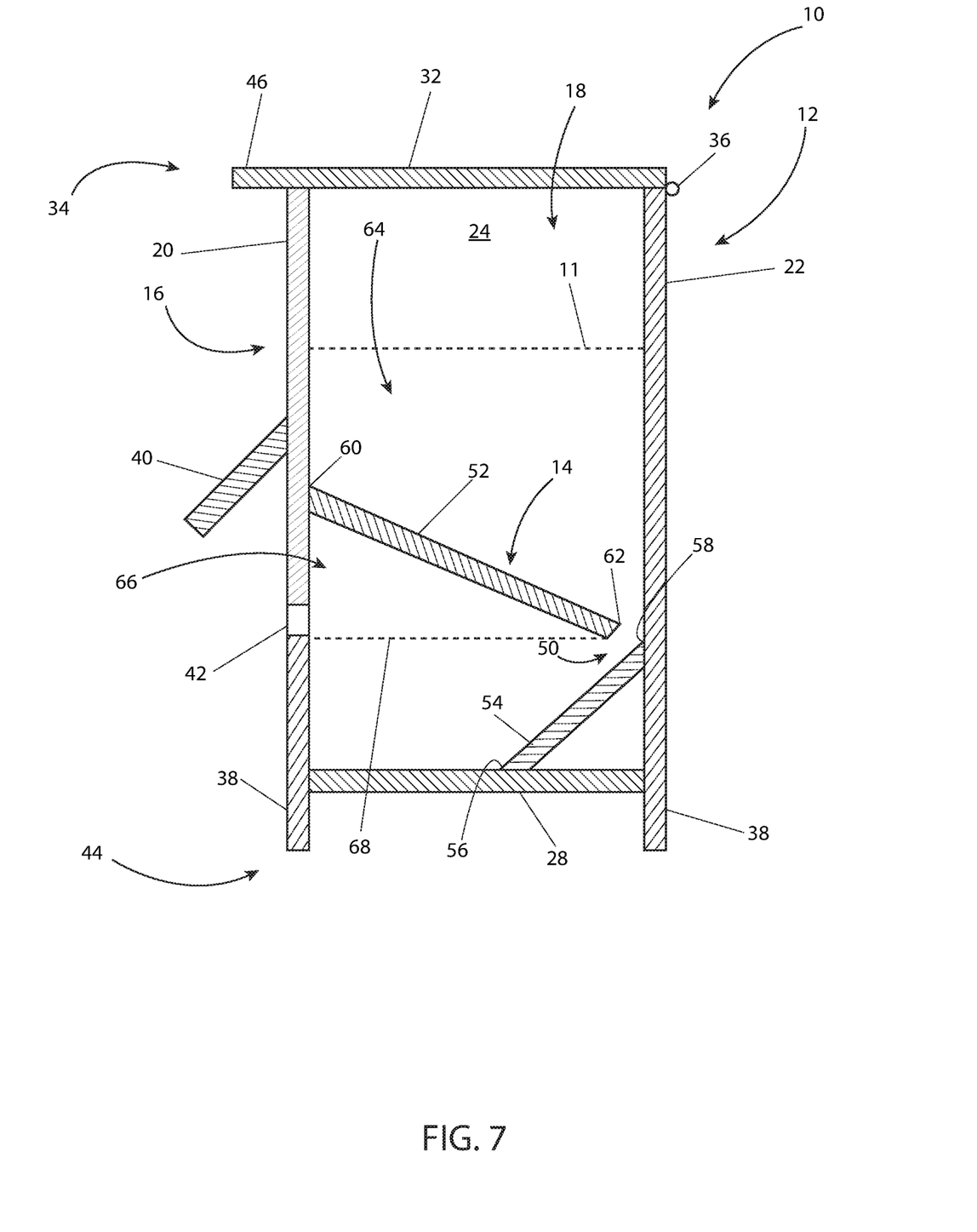
FIG. 7 is a side elevation, sectional view of an embodiment of the disclosed apparatus; and, FIG. 8 is a side elevation, sectional view of an embodiment of the disclosed apparatus.

Referring to FIG. 7, in another example construction of the apparatus 10, the upper baffle 52 is spaced away from the lower baffle 54 by gap 50. In an example, gap 50 has a linear dimension of approximately one-half inch (½ in.). In an example construction, the upper baffle 52 is orientated approximately perpendicular to the lower baffle 54. In this example, the upper baffle 52 is positioned proximate to the upper end of the lower baffle 54 connected to the back wall 22.

Figure 8:
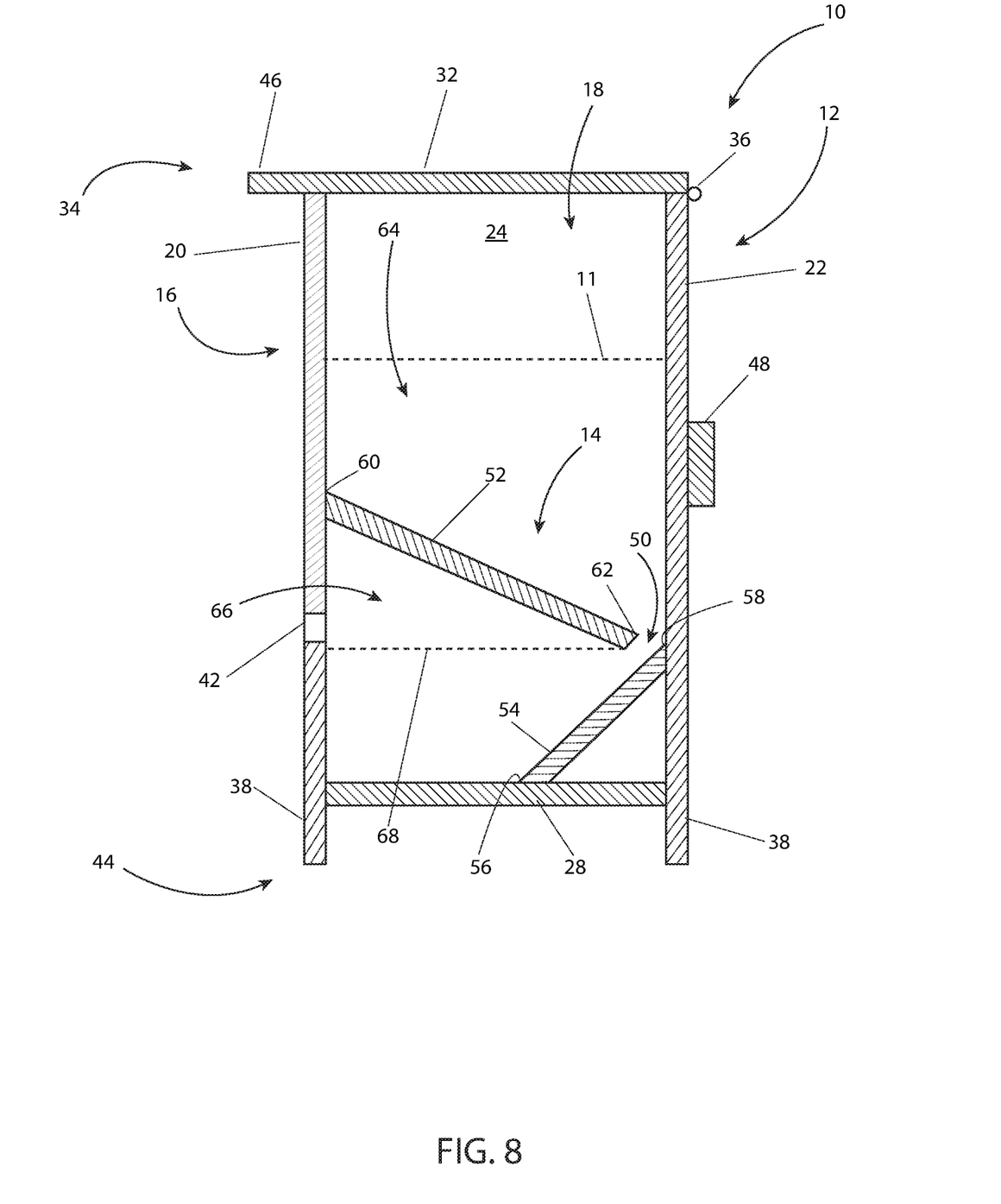

Referring to FIG. 8, in another embodiment, the apparatus 10 also includes a mounting element 48. The mounting element 48 is configured to enable the apparatus 10 to be mounted to or suspended from an approximately vertical support surface, such as a wall (not shown). In an example construction, is connected to an exterior of the back wall 22 and is located at the approximately middle of the back wall 22. In an example, the mounting element 48 is a block structure having a first dimension (e.g., length) approximately equal to the first dimension of the back wall 22 and a second (e.g., height) of approximately one-and-a-half inches (1½ in.).

In some embodiments, the apparatus 10 includes the container 12 defining the interior volume 18 that is configured to hold the feed 11. The apparatus 10 also includes the baffles 14 connected to the container 12 and projecting into said interior volume 18. The apparatus 10 also includes the feeder holes 42 located through said container 12. The baffles 14 are configured to direct said feed 11 toward said feeder holes 42.

In some embodiments of the apparatus 10, the container 12 includes the front wall 20, the back wall 22, the left wall 24, the right wall 26, the bottom wall 28, and the open top 30. The baffles 14 includes the lower baffle 54 projecting upwardly from said bottom wall 28 and the upper baffle 52 projecting inwardly from said front wall 20 and toward said lower baffle 54. The feeder holes 42 are located through said front wall 20 and are spaced above said bottom wall 28.

In some embodiments of the apparatus 10, the lower baffle 54 includes a lower baffle-first end 56, connected to said bottom wall 28, and a lower baffle-second end 58. The upper baffle 52 includes an upper baffle-first end 60, connected to said front wall 20, and an upper baffle-second end 62, spaced away from said lower baffle 54 and forming the gap 50 between said upper baffle-second end 62 and said lower baffle 54. The gap 50 defines a flow path for said feed 11.

In some embodiments of the apparatus 10, the upper baffle 52, an upper portion of said lower baffle 54, an upper portion of said front wall 20, and an upper portion of said back wall 22 define an upper sub-chamber 64 of said interior volume 18 of said container 12. The upper baffle 52, a lower portion of said lower baffle 54, a front portion of said bottom wall 28, and a lower portion of said front wall 20 define a lower sub-chamber 66 of said interior volume 18 of said container 12. The gap 50 formed between said upper baffle-second end 62 and said lower baffle 54 directs said feed 11 from said upper sub-chamber 64 to said lower sub-chamber 66.

In some embodiments of the apparatus 10, a location of said upper baffle-second end 62 relative to said lower baffle 54 defines a feed level 68 of said feed 11 within said lower sub-chamber 66. In an example, the upper baffle-second end 62 is located proximate to said lower baffle-second end 58. In another example, the upper baffle-second end 62 is located proximate to a mid-point of said lower baffle 54, located between said lower baffle-first end 56 and said lower baffle-second end 58. In another example, the upper baffle-second end 62 is located between said lower baffle-second end 58 and a mid-point of said lower baffle 54, located between said lower baffle-first end 56 and said lower baffle-second end 58.

In some embodiments of the apparatus 10, the gap 50 formed between said upper baffle-second end 62 and said lower baffle 54 is located above said feeder holes 42.

In some embodiments of the apparatus 10, the baffles 14 include the first lower baffle 54-1 projecting upwardly from said bottom wall 28 toward said back wall 22, the second lower baffle 54-2 projecting upwardly from said bottom wall 28 toward said front wall 20, the first upper baffle 52-1 projecting inwardly from said front wall 20 and toward said first lower baffle 54-1, and the second upper baffle 54-2 projecting inwardly from said back wall 28 and toward said second lower baffle 54-2. First feeder holes 42-1 are located through said front wall 20 and are spaced above said bottom wall 28. Second feeder holes 42-2 are located through said back wall 22 and are spaced above said bottom wall 28.

In some embodiments of the apparatus 10, the first lower baffle 54-1 includes a first lower baffle-first end 56, connected to said bottom wall 28, and a first lower baffle-second end 58. The second lower baffle 54-2 includes a second lower baffle-first end 56, connected to said bottom wall 28, and a second lower baffle-second end 58 connected to said first lower baffle-second end 58. The first upper baffle 52-1 includes a first upper baffle-first end 60, connected to said front wall 20, and a first upper baffle-second end 62, spaced away from said first lower baffle 54-1 forming a first gap 50-1 between said first upper baffle-second end 62 and said first lower baffle 54-1. The first gap 50-1 defining a first flow path for said feed 11. First feeder holes 42-1 are located through said front wall 20 and are spaced above the first gap 50-1. The second upper baffle 52-2 includes a second upper baffle-first end 60, connected to said back wall 22, and a second upper baffle-second end 62, spaced away from said second lower baffle 54-2 forming a second gap 50-2 between said second upper baffle-second end 62 and said second lower baffle 54-2. The second gap 50-2 defining a second flow path for said feed 11. Second feeder holes 42-2 are located through said back wall 22 and are spaced above the second gap 50-2.

In some embodiments of the apparatus 10, the first upper baffle 52-1, said second upper baffle 52-2, an upper portion of said first lower baffle 54-1, an upper portion of said second lower baffle 54-2, an upper portion of said front wall 20, and an upper portion of said back wall 22 define the upper sub-chamber 64 of said interior volume 18 of said container 12. The first upper baffle 52-1, a lower portion of said first lower baffle 54-1, a front portion of said bottom wall 28, and a lower portion of said front wall 20 define a first lower sub-chamber 66-1 of said interior volume 18 of said container 12. The second upper baffle 52-2, a lower portion of said second lower baffle 54-2, a back portion of said bottom wall 28, and a lower portion of said back wall 22 define a second lower sub-chamber 66-2 of said interior volume 18 of said container 12. The first gap 50-1 formed between said first upper baffle-second end 62 and said first lower baffle 54-1 directs said feed 11 from said upper sub-chamber 64 to said first lower sub-chamber 66-1. The second gap 50-2 formed between said second upper baffle-second end 62 and said second lower baffle 54-2 directs said feed 11 from said upper sub-chamber 64 to said second lower sub-chamber 66-2.

In some embodiments of the apparatus 10, a location of said first upper baffle-second end 62 relative to said first lower baffle 54-1 defines a feed level 68 of said feed 11 within said first lower sub-chamber 66-1. A location of said second upper baffle-second end 62 relative to said second lower baffle 54-2 defines a feed level 68 of said feed 11 within said second lower sub-chamber 66-2. In an example, the first upper baffle-second end 62 is located proximate to said first lower baffle-second end 58 and the second upper baffle-second end 62 is located proximate to said second lower baffle-second end 58. In another example, the first upper baffle-second end 62 is located proximate to a mid-point of said first lower baffle 54-1, located between said first lower baffle-first end 56 and said first lower baffle-second end 58, and the second upper baffle-second end 62 is located proximate to a mid-point of said second lower baffle 54-2, located between said second lower baffle-first end 56 and said second lower baffle-second end 58. In another example, the first upper baffle-second end 62 is located between said first lower baffle-second end 58 and a mid-point of said first lower baffle 54-1, located between said first lower baffle-first end 56 and said first lower baffle-second end 58, and the second upper baffle-second end 62 is located between said second lower baffle-second end 58 and a mid-point of said second lower baffle 54-2, located between said second lower baffle-first end 56 and said second lower baffle-second end 58. In another example, the first upper baffle-second end 62 is located proximate to said first lower baffle-second end 58 and the second upper baffle-second end 62 is located between said second lower baffle-second end 58 and a mid-point of said second lower baffle 54-2, located between said second lower baffle-first end 56 and said second lower baffle-second end 58. In another example, the first upper baffle-second end 62 is located between said first lower baffle-second end 58 and a mid-point of said first lower baffle 54-1, located between said first lower baffle-first end 56 and said first lower baffle-second end 58, and the second upper baffle-second end 62 is located proximate to said second lower baffle-second end 58.

In some embodiments of the apparatus 10, the first gap 50-1 formed between said first upper baffle-second end 62 and said first lower baffle 54-1 is located above said first feeder holes 42-1. The first gap 50-1 has a first dimension of between approximately one-half inch (½ in.) and approximately one inch (1 in.). The second gap 50-2 formed between said second upper baffle-second end 62 and said second lower baffle 54-2 is located above said second feeder holes 42-2. The second gap 50-2 has a second dimension of between approximately one-half inch (½ in.) and approximately one inch (1 in.).

In some embodiments of the apparatus 10, the feeder holes 42 are sized to enable insertion of a chicken head through said container 12 and the feeder holes 42 are located between approximately four inches (4 in.) and approximately eight inches (8 in.) above ground level.

The relative positions of the baffles 14, such as the position of the upper baffle 52 relative to the lower baffle 54, advantageously maintains a steady flow of the feed 11 from within the interior volume 18 of the container 12 to the feeder holes 42. In some examples, the upper baffles 52 are mounted well above the feeder holes 42 to give head room for the chickens to feed. The angular orientation of the upper baffles 52 relative to the walls 16 of the container 12, such as the forty-five-degree (45°) angle, facilitates the feed 11 easily and reliably sliding down to the lower baffles 54 and into the lower sub-chamber 66. The angular orientation of the lower baffles 54 relative to the bottom wall 28 facilitates reversing the flow direction of the feed 11 into the lower sub-chamber 66 and toward the feeder holes 42. The dimension of the gap 50 enables appropriately sets the flow rate of the feed 11 from the upper sub-chamber 64 into the lower sub-chamber 66, between the upper baffle 52 and the lower baffle 54, and prevents the feed 11 from becoming clogged between the upper baffle 52 and the lower baffle 54. As an example, if the gap 50 is too small, it may unacceptably restrict the flow of feed 11 into the lower sub-chamber 66. Disadvantageously, this may cause a clog in the apparatus 10. As another example, if the gap 50 is too large, it may permit excessive amounts of feed 11 to pass between the upper baffle 52 and the lower baffle 54 and into the lower sub-chamber 66, which may then pile up proximate to the feeder holes 42. Disadvantageously, this may allow chickens the ability to dig out the feed 11 with their beaks. In various embodiments, the upper baffles 52 intersect the lower baffles 54 proximate to the upper ends of the lower baffles 54 or below the upper ends of the lower baffles 54. Generally, the upper baffles 52 do not intersect the lower baffles 54 below the mid-point of the lower baffles 54. Disadvantageously, if the upper baffles 52 intersect the lower baffles 54 too low (e.g., below the mid-point of the lower baffles 54), the flow of the feed 11 may become restricted and cause a clog. The location (e.g., height) of feeder holes 42 above the bottom wall 28 and the gap 50, which sets the feed level 68 of the feed 11, enables preventing the chickens from digging the feed 11 out of the container 12 with their beaks. Disadvantageously, if the feeder holes 42 are lower, the chickens may be capable of pulling the feed 11 out from the container 12, which may cause feed 11 to be wasted. Accordingly, the disclosed apparatus 10 enables a generally maintenance free feeder.

The foregoing descriptions of specific embodiments have been presented for purposes of illustration and description. They are not intended to be exhaustive or to limit to the precise forms disclosed and many modifications and variations are possible in light of the above teachings. The embodiments were chosen and described in order to best explain principles and practical application to enable others skilled in the art to best utilize the various embodiments with various modifications as are suited to the particular use contemplate

The invention claimed is:

1. An apparatus for dispensing feed to chickens, said apparatus comprising:
a container defining an interior volume configured to hold said feed;
a plurality of baffles connected to said container and projecting into said interior volume; and
a plurality of feeder holes located through said container;
wherein said baffles are configured to direct said feed toward said feeder holes;
wherein a location of an upper baffle second end relative to a lower baffle defines a feed level of said feed within a lower sub-chamber; and
wherein a gap formed between said upper baffle second end and said lower baffle is located above said feeder holes.

2. The apparatus of claim 1, wherein:
said container comprises a front wall, a back wall, a left wall, a right wall, and a bottom wall;
said baffles comprise:
a lower baffle projecting upwardly from said bottom wall; and
an upper baffle projecting inwardly from said front wall and toward said lower baffle; and
said feeder holes are located through said front wall and are spaced above said bottom wall.

3. The apparatus of claim 2, wherein:
said lower baffle comprises a lower baffle-first end, connected to said bottom wall, and
a lower baffle-second end;
said upper baffle comprises an upper baffle-first end, connected to said front wall, and an upper baffle-second end, spaced away from said lower baffle and forming a gap between said upper baffle-second end and said lower baffle; and
said gap defines a flow path for said feed.

4. The apparatus of claim 3, wherein:
said upper baffle, an upper portion of said lower baffle, an upper portion of said front wall, and an upper portion of said back wall define an upper sub-chamber of said interior volume of said container;
said upper baffle, a lower portion of said lower baffle, a front portion of said bottom wall, and a lower portion of said front wall define a lower sub-chamber of said interior volume of said container; and
said gap formed between said upper baffle-second end and said lower baffle directs said feed from said upper sub-chamber to said lower sub-chamber.

5. The apparatus of claim 1, wherein said upper baffle-second end is located proximate to said lower baffle-second end.

6. The apparatus of claim 1, wherein said upper baffle-second end is located proximate to a mid-point of said lower baffle, located between said lower baffle-first end and said lower baffle-second end.

7. The apparatus of claim 1, wherein said upper baffle-second end is located between said lower baffle-second end and a mid-point of said lower baffle, located between said lower baffle-first end and said lower baffle-second end.

8. The apparatus of claim 1, wherein:
said container comprises a front wall, a back wall, a left wall, a right wall, and a bottom wall;
said baffles comprise:
a first lower baffle projecting upwardly from said bottom wall toward said back wall;
a second lower baffle projecting upwardly from said bottom wall toward said front wall;
a first upper baffle projecting inwardly from said front wall and toward said first lower baffle;
a second upper baffle projecting inwardly from said back wall and toward said second lower baffle;
a plurality of first feeder holes are located through said front wall and are spaced above said bottom wall; and
a plurality of second feeder holes are located through said back wall and are spaced above said bottom wall.

9. The apparatus of claim 8, wherein:
said first lower baffle comprises a first lower baffle-first end, connected to said bottom wall, and a first lower baffle-second end;
said second lower baffle comprises a second lower baffle-first end, connected to said bottom wall, and a second lower baffle-second end connected to said first lower baffle-second end;
said first upper baffle comprises a first upper baffle-first end, connected to said front wall, and a first upper baffle-second end, spaced away from said first lower baffle forming a first gap between said first upper baffle-second end and said first lower baffle, said first gap defining a first flow path for said feed; and said second upper baffle comprises a second upper baffle-first end, connected to said back wall, and a second upper baffle-second end, spaced away from said second lower baffle forming a second gap between said second upper baffle-second end and said second lower baffle, said second gap defining a second flow path for said feed.

10. The apparatus of claim 9, wherein:

said first upper baffle, said second upper baffle, an upper portion of said first lower baffle, an upper portion of said second lower baffle, an upper portion of said front wall, and an upper portion of said back wall define an upper sub-chamber of said interior volume of said container;

said first upper baffle, a lower portion of said first lower baffle, a front portion of said bottom wall, and a lower portion of said front wall define a first lower sub-chamber of said interior volume of said container;

said second upper baffle, a lower portion of said second lower baffle, a back portion of said bottom wall, and a lower portion of said back wall define a second lower sub-chamber of said interior volume of said container;

said first gap formed between said first upper baffle-second end and said first lower baffle directs said feed from said upper sub-chamber to said first lower sub-chamber; and said second gap formed between said second upper baffle-second end and said second lower baffle directs said feed from said upper sub-chamber to said second lower sub-chamber.

11. The apparatus of claim 10, wherein:

a location of said first upper baffle-second end relative to said first lower baffle defines a feed level of said feed within said first lower sub-chamber; and a location of said second upper baffle-second end relative to said second lower baffle defines a feed level of said feed within said second lower sub-chamber.

12. The apparatus of claim 11, wherein:

said first upper baffle-second end is located proximate to said first lower baffle-second end; and said second upper baffle-second end is located proximate to said second lower baffle second end.

13. The apparatus of claim 11, wherein:

said first upper baffle-second end is located proximate to a mid-point of said first lower baffle, located between said first lower baffle-first end and said first lower baffle-second end; and said second upper baffle-second end is located proximate to a mid-point of said second lower baffle, located between said second lower baffle-first end and said second lower baffle second end.

14. The apparatus of claim 11, wherein:

said first upper baffle-second end is located between said first lower baffle-second end and a mid-point of said first lower baffle, located between said first lower baffle-first end and said first lower baffle-second end; and said second upper baffle-second end is located between said second lower baffle-second end and a mid-point of said second lower baffle, located between said second lower baffle-first end and said second lower baffle-second end.

15. The apparatus of claim 11, wherein:

said first upper baffle-second end is located proximate to said first lower baffle-second end; and said second upper baffle-second end is located between said second lower baffle-second end and a mid-point of said second lower baffle, located between said second lower baffle-first end and said second lower baffle-second end.

16. The apparatus of claim 11, wherein:

said first gap formed between said first upper baffle-second end and said first lower baffle is located above said first feeder holes;

said first gap has a first dimension of between one-half inch and one inch;

said second gap formed between said second upper baffle-second end and said second lower baffle is located above said second feeder holes; and said second gap has a second dimension of between one-half inch and one inch.

17. The apparatus of claim 1, wherein:

said feeder holes are sized to enable insertion of a chicken head through said container; and said feeder holes are located between four inches and eight inches above ground level.

18. The apparatus of claim 1, further comprising:

a lid pivotally connected to said container for enclosing said interior volume;

a rain guard projecting outwardly from said container above said feeder holes; and a plurality of legs projecting downwardly from container.

* * * * *